(12) United States Patent
Hu et al.

(10) Patent No.: US 10,690,934 B2
(45) Date of Patent: Jun. 23, 2020

(54) COMPACT LENS MODULE

(71) Applicant: TDK TAIWAN CORP., Taoyuan County (TW)

(72) Inventors: Chao-Chang Hu, Taoyuan County (TW); Cheng-Kai Yu, Taoyuan County (TW)

(73) Assignee: TDK TAIWAN CORP., Taoyuan County (TW)

( * ) Notice: Subject to any disclaimer, the term of this patent is extended or adjusted under 35 U.S.C. 154(b) by 244 days.

(21) Appl. No.: 14/644,253

(22) Filed: Mar. 11, 2015

(65) Prior Publication Data

US 2016/0178922 A1   Jun. 23, 2016

(51) Int. Cl.
*G02B 27/64* (2006.01)
*G02B 7/02* (2006.01)

(52) U.S. Cl.
CPC ............ *G02B 27/646* (2013.01); *G02B 7/02* (2013.01)

(58) Field of Classification Search
CPC . G02B 27/64–648; G02B 7/02; G02B 27/646
USPC ................................................ 359/554–557
See application file for complete search history.

(56) References Cited

U.S. PATENT DOCUMENTS

| | | | | |
|---|---|---|---|---|
| 5,602,675 A | * | 2/1997 | Okada ................. | G02B 27/646 348/E5.046 |
| 7,460,776 B2 | * | 12/2008 | Hirunuma ............... | G03B 5/00 348/208.11 |
| 2005/0276172 A1 | * | 12/2005 | Tsutsumi ............. | G02B 27/646 369/44.14 |
| 2008/0151063 A1 | * | 6/2008 | Mogamiya ........... | H04N 5/2253 348/208.2 |
| 2011/0267692 A1 | * | 11/2011 | Watanabe ............... | G03B 5/02 359/557 |
| 2012/0105960 A1 | * | 5/2012 | Park ..................... | G02B 27/646 359/554 |

* cited by examiner

*Primary Examiner* — William R Alexander
(74) *Attorney, Agent, or Firm* — Bacon & Thomas, PLLC (57) ABSTRACT

A lens module comprises a housing, a lens holder movably accommodated in the housing and an optical image stabilization device (OIS device). The OIS device is configured to generate a driving force according to the movement of the lens holder so as to stabilize the lens holder. The OIS device of the lens module further comprises a substrate and a plurality of driving coils received in the substrate by means of embedment so that the OIS device occupies a smaller proportion of space in the lens module and thereby to keep the lens module compact.

13 Claims, 9 Drawing Sheets

COMPACT LENS MODULE

TECHNICAL FIELD

The present invention relates to a lens module, and more particularly, to a lens driving module with a compact structure.

DESCRIPTION OF RELATED ART

In recent years, camera modules have been widely applied to various devices, and more particularly to mobile devices. Many mobile devices are even equipped with more than two camera modules, such as webcam and imaging lens, to meet consumers' different needs.

However, as mobile devices are becoming more and more compact, reducing the volume of various lens modules is a challenging task. Take a vibration-proof lens as an example, the vibration-proof mechanism disposed therein usually consists of a number of components. The assembled components occupy certain space in the lens module so that the thickness of the lens module cannot be reduced significantly.

Figure 1A:
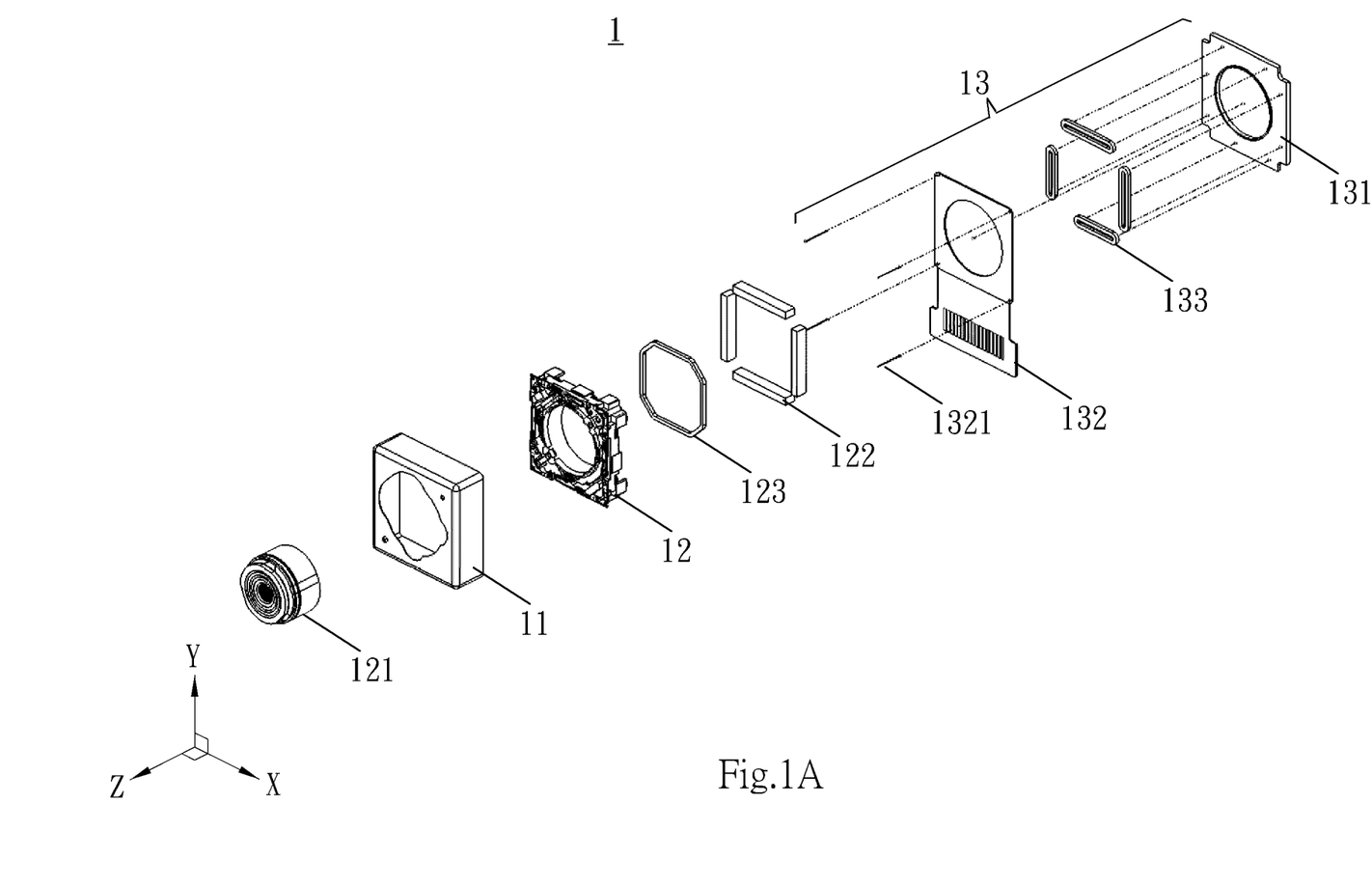
FIG. 1A is a perspective view of a prior art lens module.
Figure 1B:
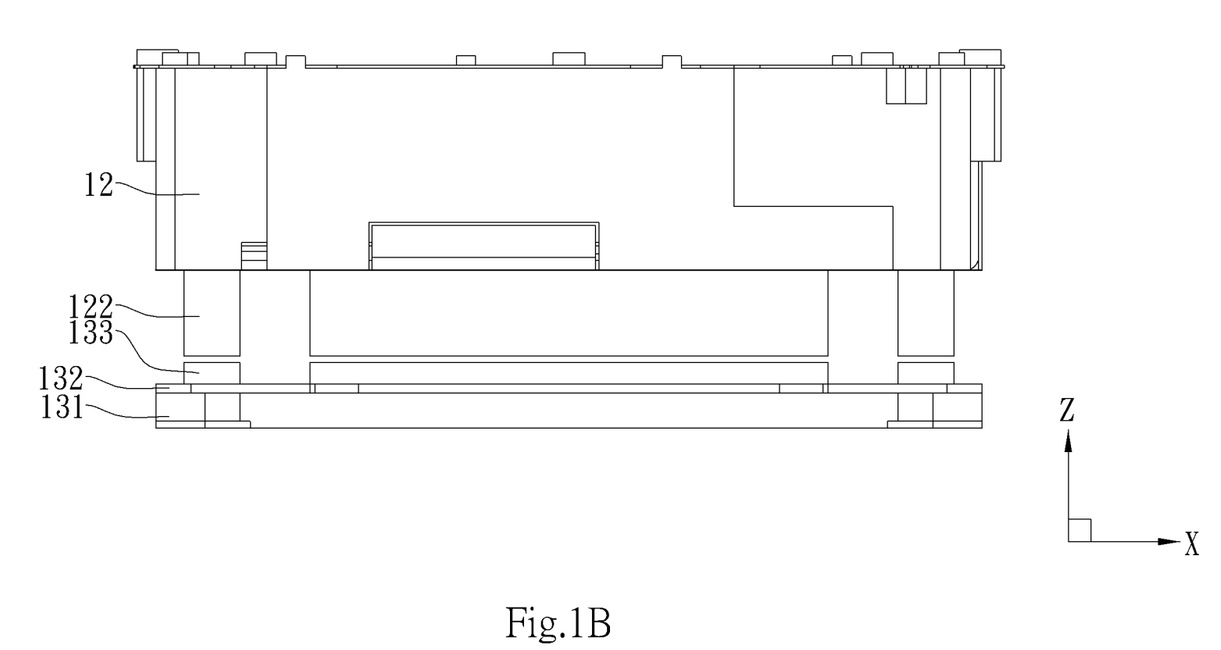
FIG. 1B is a side view according to FIG. 1A.

FIG. 1A is a perspective view showing a prior art lens module 1 (particularly a vibration-proof lens module), which can be accommodated in an electronic device (not shown) and, together with the viewfinder (not shown) of the electronic device, forms an imaging channel. The lens module 1 comprises a housing 11, a lens holder 12 and an optical image stabilization device (hereafter referred to as OIS device) 13. The housing 11 accommodates therein the lens holder 12 and the OIS device 13 and enables the lens holder 12 to be a movable portion (movable in the Z direction and/or the X-Y direction) via specific position limiting elements (such as reeds, supporting poles, and etc.). Moreover, the OIS device 13 can be fixed inside the housing 11 with structural support from the position limiting elements. The lens holder 12 has an accommodation space capable of holding at least one lens unit (which can be regarded as a lens) 121. A plurality of magnets 122 are disposed at an outer side of the lens holder 12, e.g., as shown in FIG. 1B. The plurality of magnets 122 are configured to receive an electromagnetically induced force (a driving force in the X-Y direction) generated by the OIS device 13 so that the lens holder 12 acted upon by the force can move in the X-Y direction. The lens holder 12 can be further provided with a focusing coil 123. The lens holder 12 is acted upon by a driving force in the Z direction exerted by the OIS device 13. The OIS device 13 mainly consists of a substrate 131, a circuit board 132, and a plurality of driving coils 133. The plurality of driving coils 133 are fixed to one side of the circuit board 132 at positions corresponding to the positions of the plurality of magnets 122 and electrically connected to the circuit laid out on the circuit board 132. The plurality of driving coils 133 are sandwiched between the circuit board 132 and the substrate 131. For example, the circuit board 132 enables the lens holder 12 and/or the OIS device 13 to have a specific connection relation through the connection of a plurality of supporting poles 1321. The housing 11, the circuit board 132 and the substrate 131 respectively define an opening in a direction along the optical axis (Z axis), and these openings together with the lens 121 form an optical imaging channel. An imaging module (not shown) is usually arranged at the rear end of the lens module and positioned on the imaging channel to receive light for forming images. One or more driving signals flow through the plurality of driving coils 133 via the circuit board 132 to generate a driving force that forces the lens holder 12 carrying the plurality of magnets 122 to move in the X-Y axis direction and/or the Z axis direction so that the lens 121 moved due to an external force acting thereupon can be stabilized and returned to the correct image formation position. The direction of the driving force can be determined by the relative positions of the plurality of magnets 122 and the plurality of driving coils 123, 133. Said driving force can be initiated by a closed system or an open system. For example, a closed system can confirm the movement path or position of the lens holder 12 via a position sensor (e.g. a Hall sensor) and thereby to cause the coils 123, 133 to generate a driving force. An open system can generate a driving force according to the relation between the degree of variation of the reeds and an initiating current signal (e.g. a detection signal of a gyroscope). Such a system is conceivable for a person skilled in the art, thus no further description will be provided.

It can be seen from FIGS. 1A and 1B that the thickness of the vibration-proof lens module 1 depends, at least in part, on the thicknesses of the lens holder 12 and the OIS device 13, that is, the thickness of the vibration-proof lens module 1 is at least greater than a combined thickness of the lens holder 12 and the OIS device 13. The thickness of the lens holder 12 may depend on the thickness(es) of the lens 121 and/or the magnet 122. The thickness of the OIS device 13 depends on the thicknesses of the substrate 131, the circuit board 132 and the driving coil 133. Normally, the number of loops of the driving coil 133 is increased to enable the OIS device 13 to provide a sufficient thrust force. Such an arrangement, however, also increases the thickness of the OIS device 13 and makes it even more difficult to keep the vibration-proof lens module 1 compact. On the contrary, reducing the number of loops of the driving coil 133 to keep the vibration-proof lens module 1 compact will weaken the magnetic thrust force generated by the OIS device 13.

In order to further reduce the thickness of the electronic device, the configuration of components (such as OIS mechanism) in the lens module is one of the problems to be solved.

SUMMARY

An object of the present invention is to provide a compact lens module.

To solve the problem caused by the aforementioned prior art technique, the present invention provides a lens module, comprising: a housing, a lens holder and an OIS device. The lens holder is movably accommodated in the housing, and the OIS device generates a driving force (e.g. a magnetic thrust force) according to the movement of the lens holder so as to stabilize the lens holder. The lens module of the present invention is characterized in that the OIS device further comprises a substrate and a plurality of driving coils received in the substrate by means of embedment and arranged at positions corresponding to the positions of a plurality of magnets at an outer side of the lens holder.

Accordingly, the OIS device occupies a smaller proportion of space in the lens module while maintaining a sufficient driving effect—that is to say, there is no need to reduce the number of loops of the driving coil to keep the lens module compact. With the aforementioned arrangement, the thickness of the lens module depends, at least in part, on the thickness of the substrate, and is smaller than the thickness of a conventional OIS device (a combined thickness of the driving coil, the circuit board and the substrate).

The foregoing aspects and other aspects of the present invention will be fully described with exemplary embodiments below by reference to the appended drawings.

DETAILED DESCRIPTION

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated on the appended drawings and limited thereto.

A lens module, particularly a vibration-proof lens module as shown in FIG. 1A, provided by the present invention at least comprises a housing 11 and a lens holder 12 configured to project light to an imaging module at the rear end. Relevant details of the housing 11 and the lens holder 12 have been disclosed by the prior art techniques and shown in FIG. 1, thus no further description will be provided. The lens module of the present invention is characterized by comprising a compact OIS device securely accommodated in the housing 11 as shown in FIG. 1A. Said OIS device at least consists of a driving circuit, a driving coil and a substrate. The driving coil is joined to the substrate by means of embedment to form an embedded structure, and the driving coil can be arranged at a position corresponding to the position of the magnet 121 of the lens holder 12. Said OIS device will be fully described with different embodiments below.

Figure 2A:
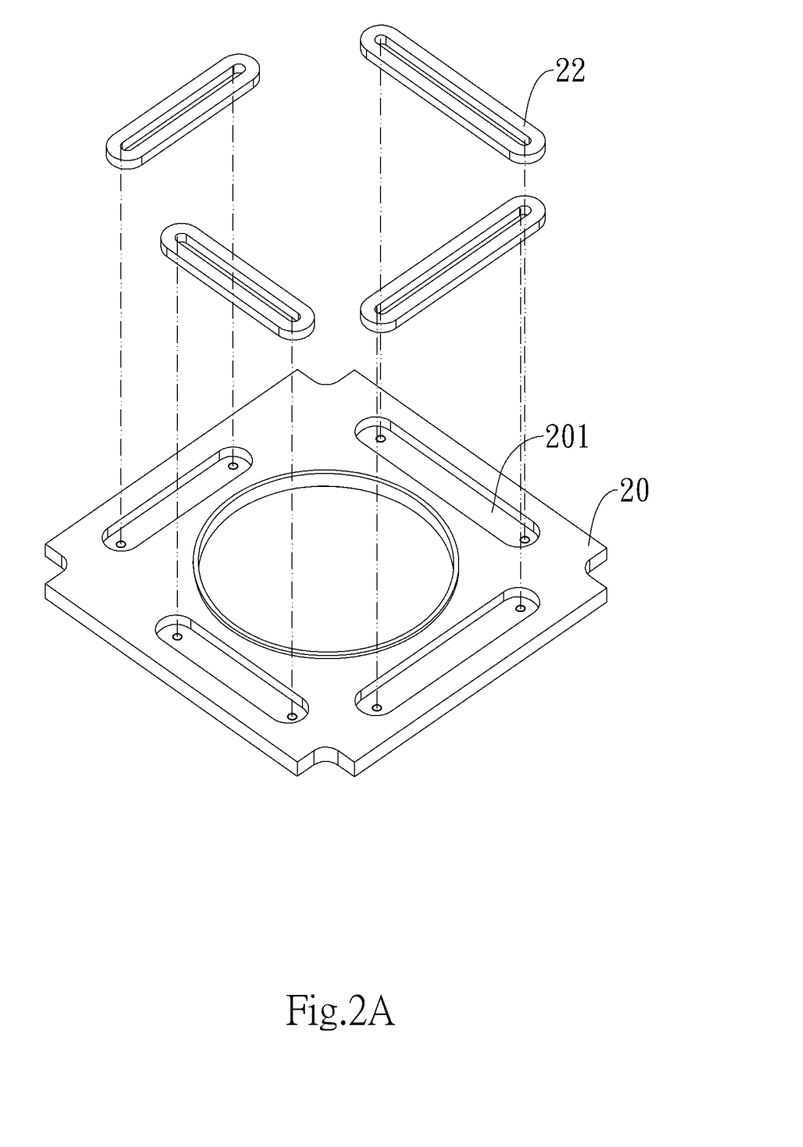
FIG. 2A is a perspective view showing an embodiment of the embedded coils of the present invention.

FIG. 2A is a perspective view showing an embodiment of said embedded structure comprising a substrate 20 and a plurality of driving coils 22. A surface of the substrate 20 defines a plurality of accommodation slots 201. Each of the plurality of driving coils 22 is formed by winding one or multiple coils, and the size thereof is smaller than or equal to the space of the accommodation slot 201 so that each of the plurality of driving coils 22 is accommodated in a corresponding accommodation slot 201 and can be fixed with an adhesive. In the embodiments of the present invention, the plurality of accommodation slots 201 may be of different sizes, and the plurality of driving coils 22 may also have different sizes, which can be adjusted according to the spatial arrangement or the driving method adopted. In other embodiments of the present invention, the accommodation slot 201 may accommodate more than one driving coils 22. With the embedding configuration described in the embodiment shown in FIG. 2A, the combined thickness of the substrate 20 and the plurality of driving coils 22 can be the thickness of the substrate 20 per se or the thickness of the substrate 20 plus a partial thickness of the driving coil 22. In the embodiments of the present invention, the plurality of accommodation slots 201 may be of other shapes, such as arc, so as to accommodate driving coils of other shapes.

Figure 2B:
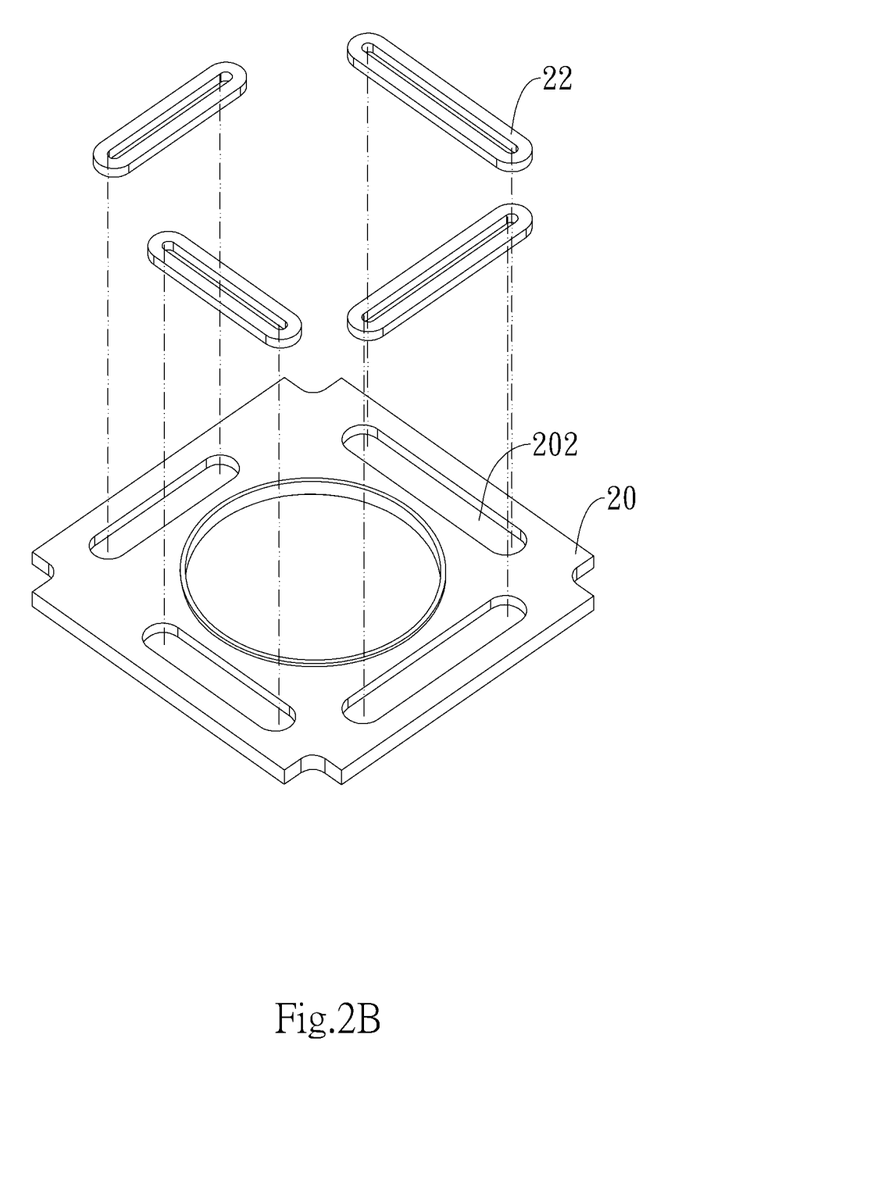
FIG. 2B is a perspective view showing another embodiment of the embedded coils of the present invention.

FIG. 2B is a perspective view showing another embodiment of said embedded structure. The embodiment shown in FIG. 2B is different from the embodiment shown in FIG. 2A in that a plurality of accommodation holes 202 rather than a plurality of accommodation slots 201 are defined in the substrate 20. Each of the plurality of accommodation holes 202 can accommodate a corresponding driving coil 22, and the driving coil 22 can be securely joined to the accommodation hole 202 with an adhesive or other conventional means. With the embedding configuration described in the embodiment shown in FIG. 2B, the combined thickness of the substrate 20 and the plurality of driving coils 22 can be the thickness of the substrate 20 per se or the thickness of the substrate 20 plus a partial thickness of the driving coil 22.

The thickness of the OIS device in the lens module of the present invention mainly depends on the thickness of the substrate 20, the depth of the accommodation slot 201 or the accommodation hole 202 and the thickness of the driving coil 22 no matter whether the accommodation space is an accommodation slot 201 or an accommodation hole 202. Therefore, the thickness of an electronic device, particularly an electronic device in form of a tablet, equipped with the compact lens module of the present invention can be further reduced. Exemplary embodiments of the OIS device will be described below according to the aforementioned embedded structure.

Figure 3A:
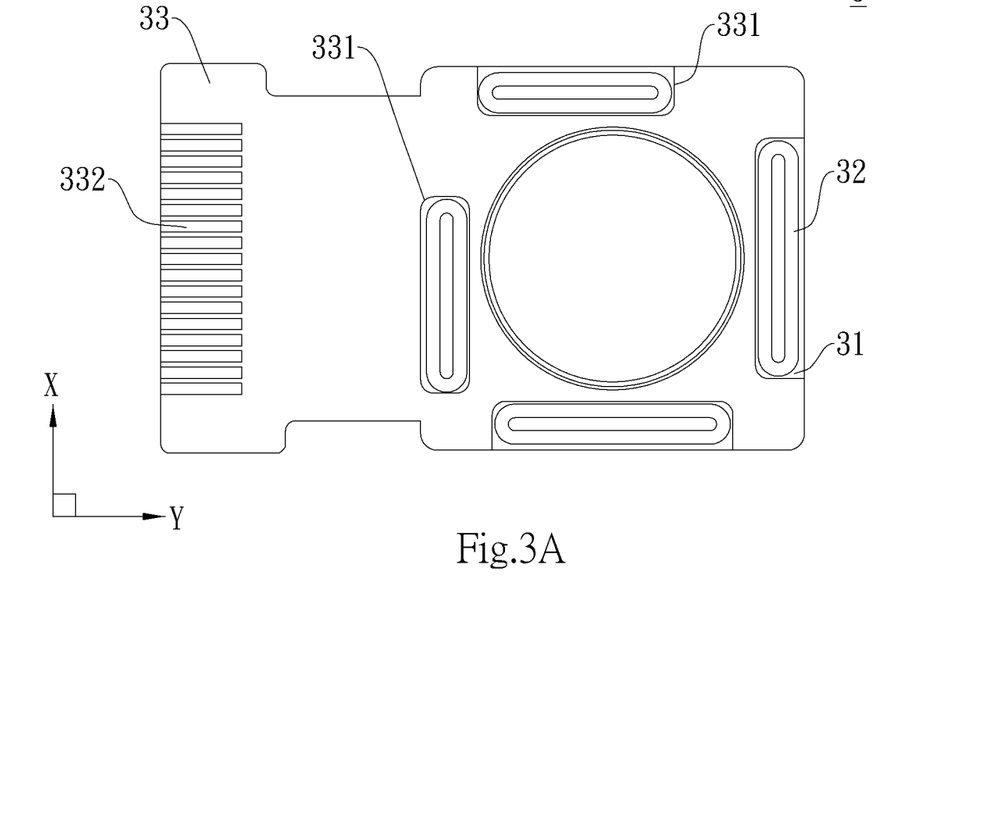
FIG. 3A is a top elevation view showing the first embodiment of the OIS device of the present invention (the top elevation view described hereafter is viewed at an angle in an image formation direction along the optical axis).
Figure 3B:
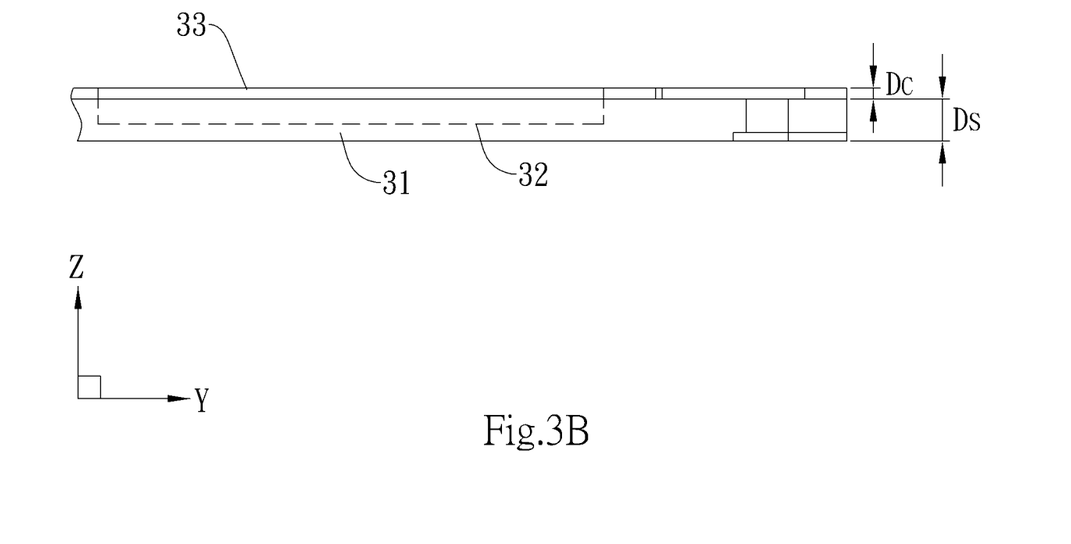
FIG. 3B is a partial side view according to FIG. 3A.

FIGS. 3A and 3B are a top elevation view and a partial side view showing the first embodiment of the OIS device of the present invention. The OIS device 3 can be substituted for the OIS device 13 shown in FIGS. 1A and 1B to provide the lens holder (i.e. the movable portion) with an appropriate driving force, thereby stabilizing the movable lens holder. The OIS device 3 comprises a substrate 31, a plurality of driving coils 32 and a circuit board 33.

In the first embodiment, the plurality of driving coils 32 are joined to the substrate 31 by means of embedment, as in a manner shown in FIGS. 2A and 2B. The circuit board 33 is loaded with a driving circuit. The circuit board 33 can be securely superposed on the substrate 31 by adherence or other conventional means. The circuit board 33 has a plurality of cutouts 331 corresponding to the plurality of driving coils 32 so that the plurality of driving coils 32 will be partially exposed when the circuit board 33 covers the substrate 31. One side of the circuit board 33 is provided with conductive wires (not shown) extending to connect to a plurality of electrical contacts 332. The electrical contacts described in the embodiments of the present invention may be arranged for signal output or signal input, or configured into, for example, a bus for both signal output and signal input. The plurality of electrical contacts 332 further electrically connect with a control module (not shown) to receive external control signals. For example, the circuit board 33 may be a flexible printed circuit (FPC) which can electrically connect to each of the plurality of driving coils 32 by, for example, configuring the conductive wires to extend to an inner side surface of the accommodation slot or accommodation hole to contact the coil. In other embodiments of the present invention, the conductive wires can also be laid out on a surface of the substrate 31 to form conductive paths between the plurality of driving coils 32 and the circuit board 33, such as, molded interconnected devices (MIDs). The substrate and circuit board described herein respectively reserves an imaging opening in corresponding positions, but different forms may be adopted in other embodiments according to various configurations.

With the embedding configuration, as shown in FIG. 3B, the thickness of the OIS device 3 in this embodiment is a combination of the thickness of the substrate 31 and the thickness of the circuit board 33, i.e. ($D_S+D_C$), and this enables the thickness in the optical axis direction of the lens module equipped with the OIS device 3 to remain thin.

Figure 4A:
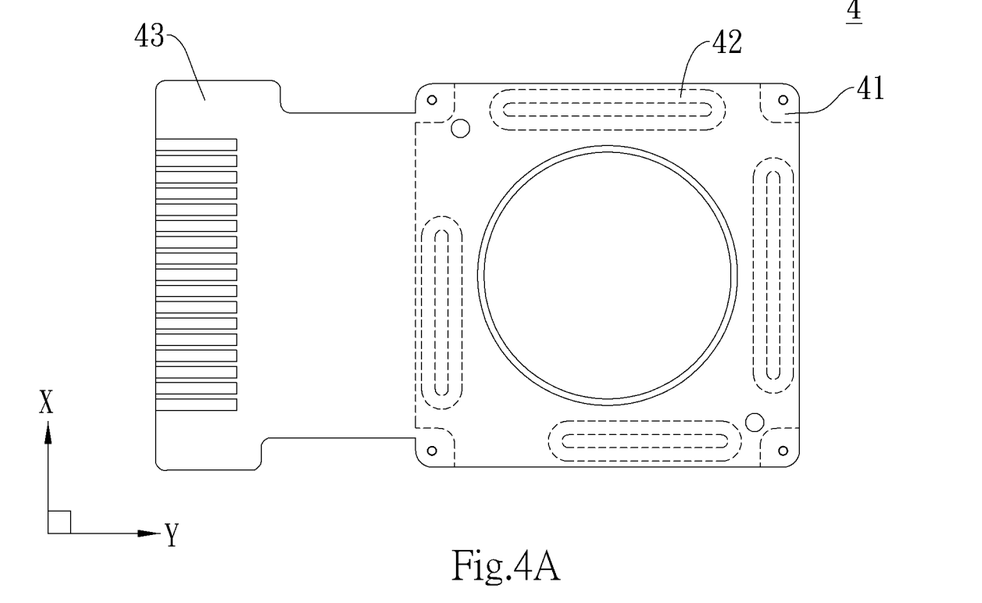
FIG. 4A is a top elevation view showing the second embodiment of the OIS device of the present invention.
Figure 4B:
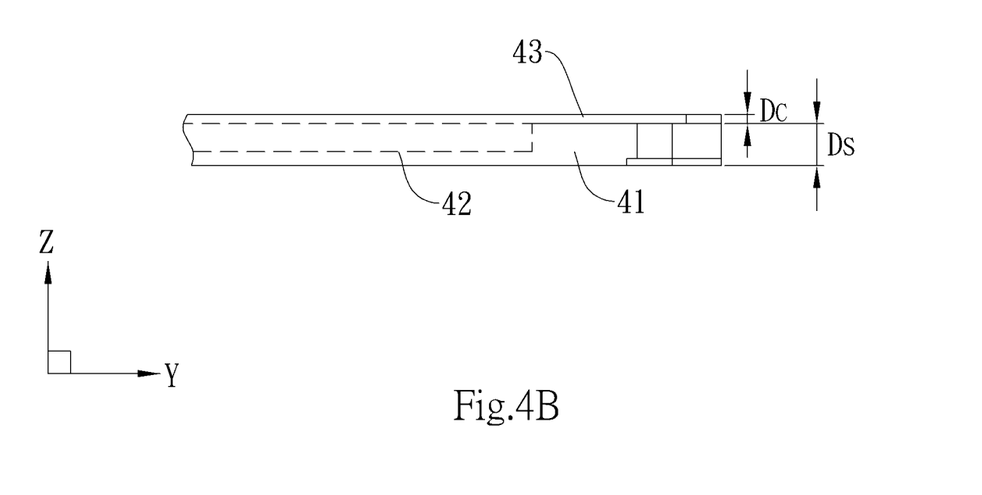
FIG. 4B is a partial side view according to FIG. 4A.

FIGS. 4A and 4B are a top elevation view and a partial side view showing the second embodiment of the OIS device of the present invention. The OIS device 4 can be substituted for the OIS device 13 shown in FIGS. 1A and 1B to provide the lens holder (i.e. the movable portion) with an appropriate driving force to stabilize the moving lens. The OIS device 4 comprises a substrate 41, a plurality of driving coils 42 and a circuit board 43 overlaying the plurality of driving coils 42. Regarding the substrate 41, the plurality of driving coils 42 and the circuit board 43 in this embodiment, the structures thereof and the functional connections therebetween are the same as those stated in the aforementioned embodiment, thus no further description will be provided. The thickness of the OIS device 4 in this embodiment is a combination of the thickness of the substrate 41 and the thickness of the circuit board 43, i.e. ($D_S+D_C$), and this enables the thickness in the optical axis direction of the lens module equipped with the OIS device 4 to be reduced.

Figure 5A:
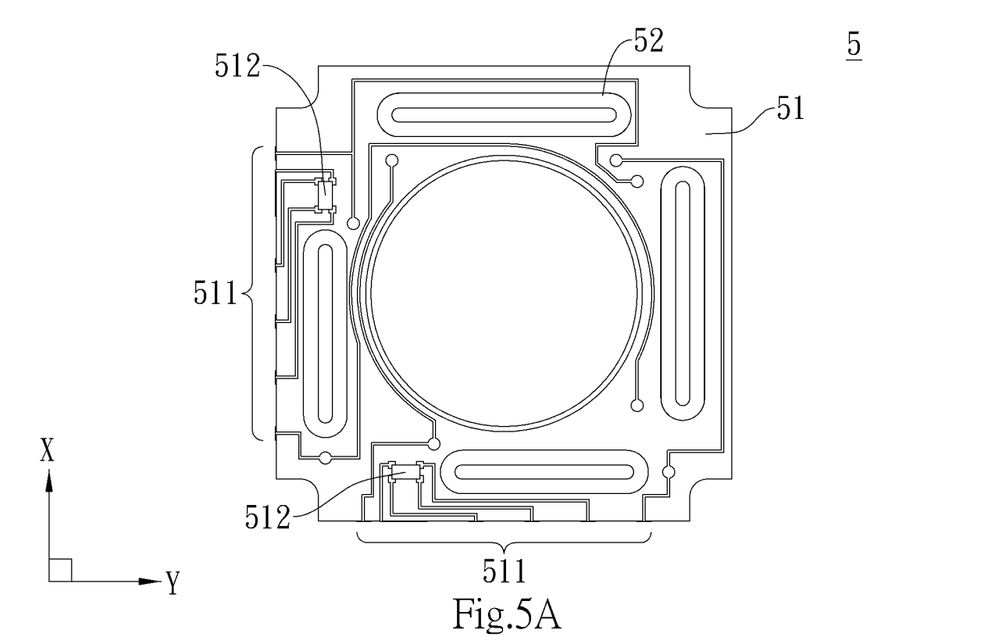
FIG. 5A is a top elevation view showing the third embodiment of the OIS device of the present invention.
Figure 5B:
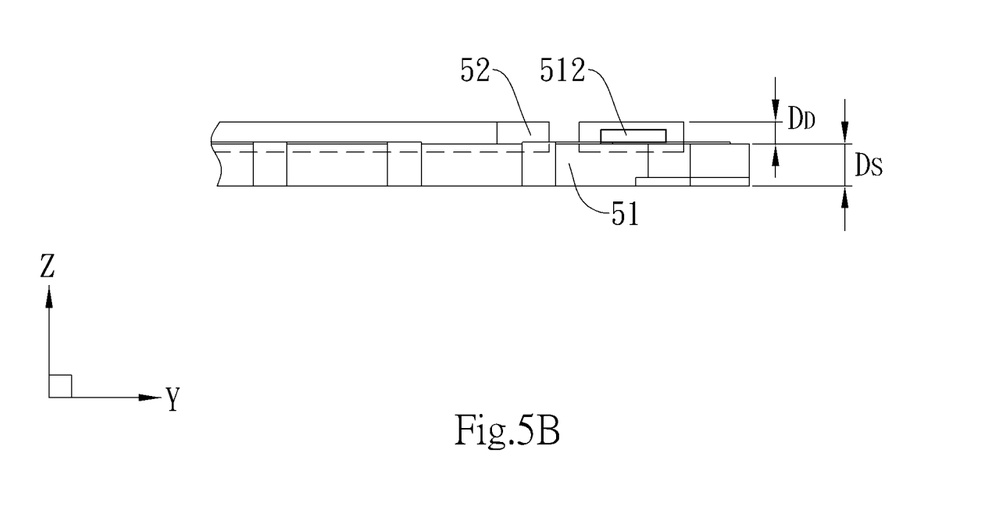
FIG. 5B is a partial side view according to FIG. 5A.

FIGS. 5A and 5B are a top elevation view and a partial side view showing the third embodiment of the OIS device of the present invention. The OIS device 5 comprises a substrate 51 and a plurality of driving coils 52 that are joined together in a manner shown in FIG. 2A or FIG. 2B. It is to be noted that a plurality of conductive wires (e.g. MIDs) and electronic components are laid out on a surface of the substrate 51, and at least one side of the substrate 51 is provided with a plurality of electrical contacts 511 which can be coupled to a control module. Said conductive wires are connected with the plurality of driving coils 52 and the electronic components, respectively, to allow for signal transmission. Said electronic components include a plurality of sensors 512, such as Hall sensors, which can be disposed at the upper surface of the substrate 51 (facing the movable member) or the lower surface of the substrate 51 (facing the imaging module). The plurality of sensors 512 are configured to detect a change in the magnetic field caused by the movement of the lens holder 12. The sensing signals generated by the plurality of sensors 512 can be transmitted to the control module via the plurality of electrical contacts 511, and the control module generates control signals based on the sensing signals and transmits the control signals to the plurality of driving coils 52 so as to generate a magnetic thrust force to stabilize the moving lens holder 12.

As shown in FIG. 5B, the thickness of the OIS device 5 in this embodiment is a combination of the thickness ($D_S$) of the substrate 51 and a partial thickness ($D_D$) of the driving coil 52. Preferably, the thickness in the Z direction of the sensor 512 is smaller than or equal to the thickness of the driving coil 52. In other embodiments, under the circumstance that the plurality of driving coils 52 and the plurality of sensors 512 are completely embedded in the substrate 51, the thickness of the OIS device 5 can also be the thickness ($D_S$) (not shown) of the substrate 51. Therefore, the thickness in the optical axis direction of the lens module equipped with the OIS device 5 in this embodiment can be reduced.

Figure 6A:
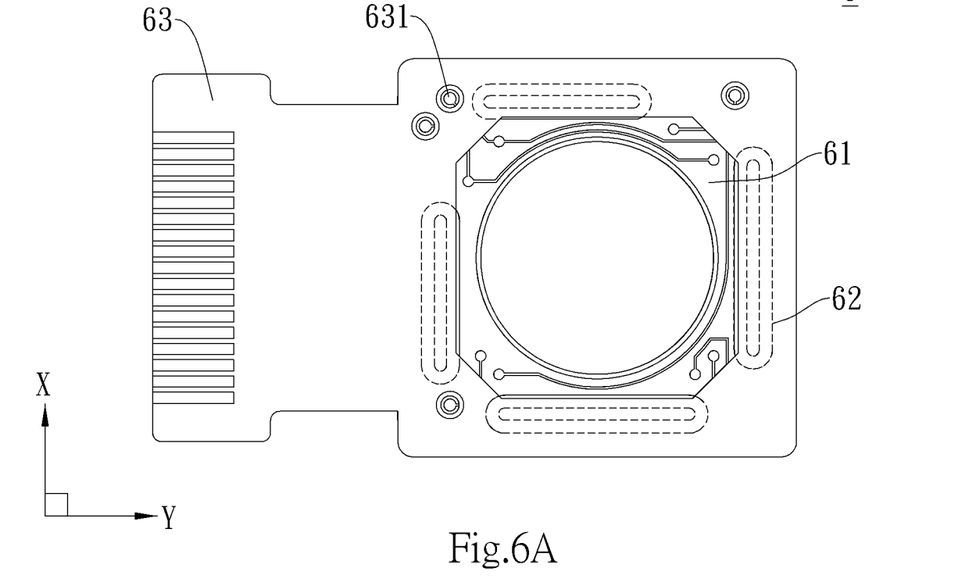
FIG. 6A is a top elevation view showing the fourth embodiment of the OIS device of the present invention.
Figure 6B:
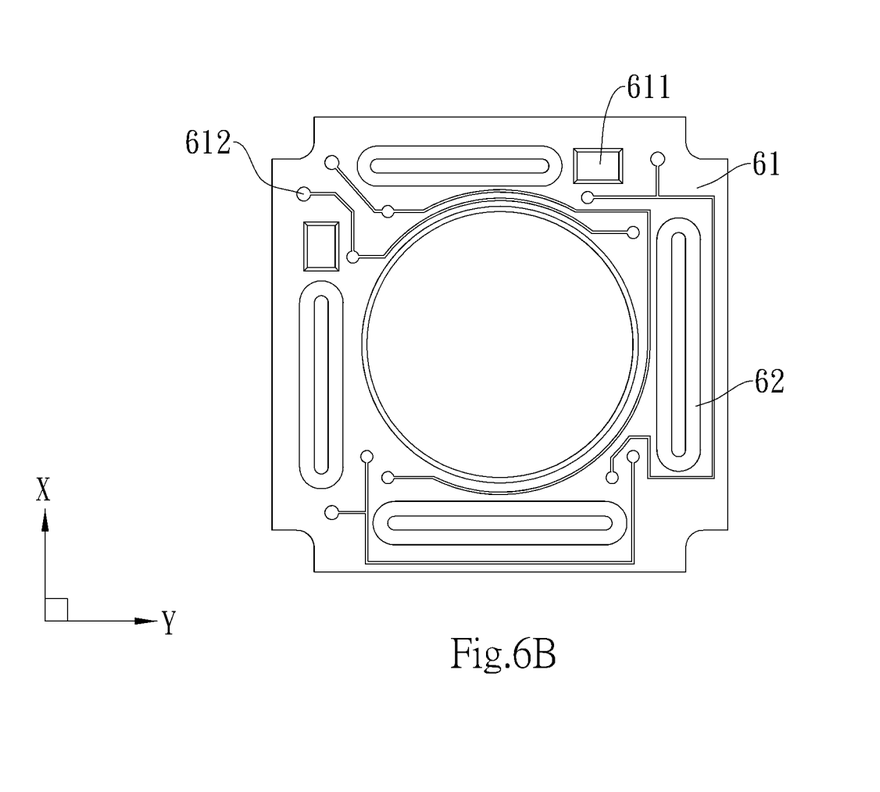
FIG. 6B is a top elevation view showing certain components in the fourth embodiment of the OIS device of the present invention.

FIGS. 6A and 6B are top elevation views showing the fourth embodiment of the OIS device of the present invention. The OIS device 6 comprises a substrate 61, a plurality of driving coils 62 and a circuit board 63. The substrate 61 and the plurality of driving coils 62 are joined together in a manner shown in FIG. 2A or FIG. 2B. The substrate may be made of MIDs. It is to be noted that the substrate 61 further defines a plurality of electronic component accommodation holes 611 and a plurality of signal connectors 612. The circuit board 63 is provided with a circuit and electronic components facing the substrate 61. Said electronic components can be said sensors (not shown) and arranged at positions corresponding to the positions of the plurality of electronic component accommodation holes 611. In addition, the circuit board 63 has a plurality of vias 631 arranged at positions corresponding to the positions of the plurality of signal connectors 612 on the substrate 61. The circumferences of plurality of vias 631 are coated with a conductive material to allow for electrical connection. With such configuration, the circuit board 63 can be securely superposed on the substrate 61 to face the plurality of driving coils 62; meanwhile, the electronic components on the circuit board 63 are accommodated in the plurality of electronic component accommodation holes 611 on the substrate 61 correspondingly, and the plurality of signal connectors 612 on the substrate 61 are coupled to the plurality of vias 631 correspondingly. Therefore, the thickness of the OIS device 6 in this embodiment is a combination of the thickness of the substrate 61 and the thickness of the circuit board 63. With such an efficient spatial arrangement, the volume of the electronic components will not affect the OIS device in terms of thickness.

Figure 7A:
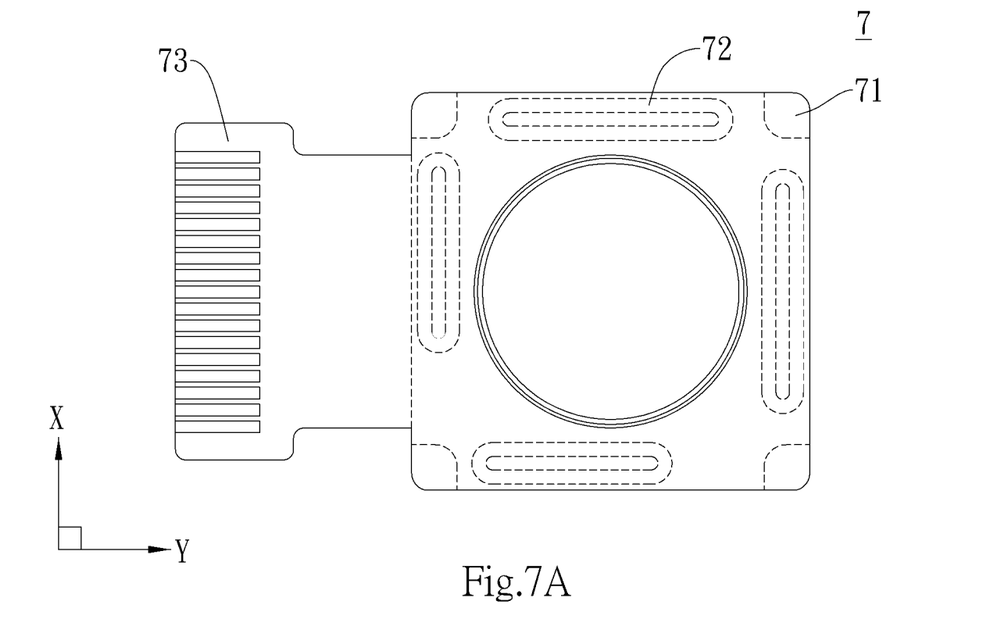
FIG. 7A is a top elevation view showing the fifth embodiment of the OIS device of the present invention.
Figure 7B:
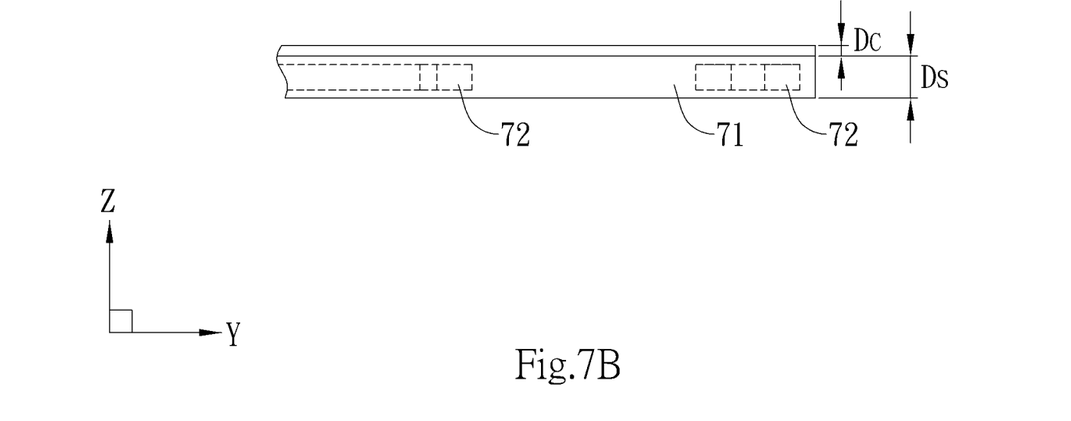
FIG. 7B is a partial side view according to FIG. 7A.

FIGS. 7A and 7B are a top elevation view and a partial side view showing the fifth embodiment of the OIS device of the present invention. The OIS device 7 comprises a substrate 71, a plurality of driving coils 72 and a circuit board 73, and the functional connections of these components are similar to those described in the aforementioned embodiments. The fifth embodiment is different from the aforementioned embodiments in that the plurality of driving coils 72 are buried in the substrate 71. Therefore, the thickness of the OIS device 7 in this embodiment is a combination of the thickness ($D_S$) of the substrate 71 and the thickness ($D_D$) of the circuit board 73.

To sum up, the thicknesses of the lens module and the electronic device equipped with the lens module depend on the thickness of the OIS device, thus the electronic device (particularly an electronic device in form of a tablet, such as tablet mobile phone, a table computer, and etc.) can be kept compact when the thickness of the OIS device is reduced.

The preferred embodiments of the compact lens module of the present invention have been described by reference to the appended drawings. All the features disclosed herein can be combined with other methods, and every feature disclosed herein can be optionally replaced with a feature with the same, equivalent or similar effect. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention without departing from the scope of the claims can be made by a person skilled in the art.

What is claimed is:

1. A lens module comprising a housing, a lens holder movably accommodated in the housing and an optical image stabilization (OIS) device for driving the lens holder, characterized in that the OIS device comprises:
   a substrate fixed relatively to and received in the housing and defining an opening and a plurality of accommodation spaces disposed around the opening;
   a plurality of driving coils respectively accommodated in the plurality of accommodation spaces correspondingly;
   a plurality of magnets disposed at a bottom surface of the lens holder, wherein the bottom surface of the lens holder is facing the substrate such that positions of the plurality of magnets correspond to positions of the plurality of driving coils, respectively; and
   a driving circuit coupled to the plurality of driving coils, the driving circuit providing to the plurality of driving coils a current signal associated with the movement of the lens holder to generate the driving force,
   wherein the driving circuit is laid out on a circuit board superposed at one side of the substrate, said circuit board having a plurality of cutouts arranged at positions corresponding to the positions of the plurality of driving coils such that the plurality of coils are exposed by the circuit board superposed on the substrate, and
   wherein the plurality of accommodation spaces are a plurality of accommodation slots concave inwardly from a surface of the substrate.

2. The lens module according to claim 1, wherein a thickness of the driving coil does not exceed a thickness of the substrate.

3. The lens module according to claim 1, wherein the driving circuit has a plurality of electrical contacts disposed at a side surface of the circuit board.

4. The lens module according to claim 1, wherein the OIS device comprises at least one sensor disposed on the substrate or the circuit board to sense the movement of the lens holder.

5. The lens module according to claim 1, wherein the lens holder further comprises a focusing coil mounted on the lens holder configured in a way to drive the plurality of magnets.

6. The lens module according to claim 1, wherein each of the accommodation slots is defined by a sidewall and a bottom surface.

7. The lens module according to claim 1, wherein the circuit board is disposed between the lens holder and the substrate accommodating the plurality of driving coils.

8. A lens module comprising a housing, a lens holder movably accommodated in the housing and an optical image stabilization (OIS) device for driving the lens holder, characterized in that the OIS device comprises:
   a substrate fixed relatively to and received in the housing and defining an opening and a plurality of accommodation spaces disposed around the opening;
   a plurality of driving coils respectively accommodated in the plurality of accommodation spaces correspondingly;
   a plurality of magnets disposed at a bottom surface of the lens holder, wherein the bottom surface of the lens holder is facing the substrate such that positions of the plurality of magnets correspond to positions of the plurality of driving coils, respectively; and
   a driving circuit coupled to the plurality of driving coils, the driving circuit providing to the plurality of driving coils a current signal associated with the movement of the lens holder to generate the driving force,
   wherein the driving circuit is laid out on a circuit board superposed at one side of the substrate, said circuit board having a plurality of cutouts arranged at positions corresponding to the positions of the plurality of driving coils such that the plurality of coils are exposed by the circuit board superposed on the substrate, and
   wherein the plurality of accommodation spaces are a plurality of accommodation holes penetrating through the surface of the substrate.

9. The lens module according to claim 8, wherein a thickness of the driving coil does not exceed a thickness of the substrate.

10. The lens module according to claim 8, wherein the driving circuit has a plurality of electrical contacts disposed at a side surface of the circuit board.

11. The lens module according to claim 8, wherein the driving circuit is laid out on a circuit board and at least one surface of the substrate, wherein the circuit board has a plurality of vias and one surface of the substrate has a plurality of signal connectors corresponding to the plurality of vias, respectively.

12. The lens module according to claim 8, wherein the OIS device comprises at least one sensor disposed on the substrate or the circuit board to sense the movement of the lens holder.

13. A lens module comprising a housing, a lens holder movably accommodated in the housing and an optical image stabilization (OIS) device for driving the lens holder, characterized in that the OIS device comprises:
   a substrate fixed relatively to and received in the housing and defining an opening and a plurality of accommodation spaces disposed around the opening;
   a plurality of driving coils respectively accommodated in the plurality of accommodation spaces correspondingly;
   a plurality of magnets disposed at a bottom surface of the lens holder, wherein the bottom surface of the lens holder is facing the substrate such that positions of the plurality of magnets correspond to positions of the plurality of driving coils, respectively; and
   a driving circuit coupled to the plurality of driving coils, the driving circuit providing to the plurality of driving coils a current signal associated with the movement of the lens holder to generate the driving force,
   wherein the plurality of accommodation spaces are a plurality of accommodation slots concave inwardly from a surface of the substrate, and
   wherein the driving circuit is laid out on a circuit board and at least one surface of the substrate, wherein the circuit board has a plurality of vias and one surface of the substrate has a plurality of signal connectors corresponding to the plurality of vias, respectively.

* * * * *